United States Patent
Yokoyama et al.

(10) Patent No.: US 12,356,110 B2
(45) Date of Patent: Jul. 8, 2025

(54) VIDEO RECORDING DEVICE AND NON-TRANSITORY COMPUTER READABLE MEDIUM

(71) Applicant: JVCKENWOOD Corporation, Yokohama (JP)

(72) Inventors: Fumihiko Yokoyama, Yokohama (JP); Tomohiro Matsuoka, Yokohama (JP); Takeshi Kuchinomachi, Yokohama (JP); Yasuo Sugita, Yokohama (JP); Takashi Himukashi, Yokohama (JP); Manabu Karasawa, Yokohama (JP); Yoshiharu Koji, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 64 days.

(21) Appl. No.: 18/228,856

(22) Filed: Aug. 1, 2023

(65) Prior Publication Data
US 2023/0379432 A1    Nov. 23, 2023

Related U.S. Application Data

(63) Continuation of application No. PCT/JP2022/000367, filed on Jan. 7, 2022.

(30) Foreign Application Priority Data

Mar. 4, 2021  (JP) .................................. 2021-034462

(51) Int. Cl.
*H04N 5/77* (2006.01)
*H04N 23/62* (2023.01)

(52) U.S. Cl.
CPC ............... *H04N 5/77* (2013.01); *H04N 23/62* (2023.01)

(58) Field of Classification Search
CPC ......... B60R 11/0229; B60R 1/00; G07C 5/00; G07C 5/085; G08G 1/0137;
(Continued)

(56) References Cited

U.S. PATENT DOCUMENTS 9,117,352 B2 * 8/2015 Yoshida ............... G08B 13/149
2008/0133088 A1 * 6/2008 Yamada ................. H04N 7/183
386/E5.072

(Continued)

FOREIGN PATENT DOCUMENTS

JP    2009-216641 A    9/2009
JP    2009-265787 A    11/2009
(Continued)

*Primary Examiner* — Thai Q Tran
*Assistant Examiner* — Stephen R Smith
(74) *Attorney, Agent, or Firm* — PROCOPIO, CORY, HARGREAVES & SAVITCH LLP

(57) ABSTRACT

A video recording device includes a data acquisition unit configured to acquire data indicating a result of detecting a phenomenon associated with an action of taking the video recording device out from a vehicle, a determination unit configured to determine whether the result indicated by the data meets a predetermined condition, and a control unit configured to control the video recording device such that an operation for an interface used to operate the video recording device is disabled when the result indicated by the data is determined to meet the predetermined condition.

9 Claims, 3 Drawing Sheets

(58) Field of Classification Search
CPC ...... H04N 5/23293; H04N 5/247; H04N 5/77; H04N 7/181; H04N 7/188; H04N 23/62
USPC ...................... 348/148, 143; 701/1, 146, 526
See application file for complete search history.

(56) References Cited

U.S. PATENT DOCUMENTS

| | | | | |
|---|---|---|---|---|
| 2010/0201819 | A1* | 8/2010 | Minowa | G07C 5/0891 348/148 |
| 2013/0074111 | A1* | 3/2013 | Hyde | H04N 21/4126 725/75 |
| 2013/0135118 | A1* | 5/2013 | Ricci | G06F 17/00 340/932.2 |
| 2015/0015706 | A1* | 1/2015 | Hatori | B60R 1/22 348/148 |
| 2018/0336144 | A1* | 11/2018 | Olarig | G06F 21/6227 |
| 2019/0077353 | A1* | 3/2019 | Lopez | B60W 50/00 |

FOREIGN PATENT DOCUMENTS

| | | |
|---|---|---|
| JP | 2016-213636 A | 12/2016 |
| JP | 2018-016116 A | 2/2018 |
| JP | 2019-121259 A | 7/2019 |
| JP | 2020-042475 A | 3/2020 |
| JP | 2021-005280 A | 1/2021 |

\* cited by examiner

VIDEO RECORDING DEVICE AND NON-TRANSITORY COMPUTER READABLE MEDIUM

CROSS REFERENCE TO RELATED APPLICATION

The present application is a continuation application of International Application No. PCT/JP2022/000367, filed on Jan. 7, 2022, which claims priority to Japanese Patent Application No. 2021-034462, filed on Mar. 4, 2021. The contents of these applications are incorporated herein by reference.

BACKGROUND

The present invention relates to a video recording device and a non-transitory computer readable medium.

Conventionally, a video recording device has been used to record a situation inside or outside a vehicle when a traffic accident occurs as a video for a purpose of appropriately resolving the traffic accident. In addition, a video recording device that can be taken out from the vehicle is also used for a purpose of making it possible to record a wider range of situations as a video. Examples of such a video recording device include, for example, a drive recorder device disclosed in Patent Document 1 (Japanese Unexamined Patent Application, First Publication No. 2009-265787). This drive recorder device is fixed to a vehicle body through a storage box and is in a state of being able to be taken out from the storage box.

SUMMARY

However, the drive recorder device described above may execute unnecessary processing in some cases due to an erroneous operation of a touch panel display, buttons, or the like when it is taken out from the storage box.

According to one aspect of the present embodiment, a video recording device includes a data acquisition unit configured to acquire data indicating a result of detecting a phenomenon associated with an action of taking the video recording device out from a vehicle, a determination unit configured to determine whether the result indicated by the data meets a predetermined condition, and a control unit configured to control the video recording device such that an operation for an interface used to operate the video recording device is disabled when the result indicated by the data is determined to meet the predetermined condition.

According to another aspect of the present embodiment, a non-transitory computer readable medium storing a program causing a computer to execute a data acquisition function of acquiring data indicating a result of detecting a phenomenon associated with an action of taking a video recording device out from a vehicle, a determination function of determining whether a result indicated by the data meets a predetermined condition, and a control function of controlling the video recording device such that an operation for an interface used to operate the video recording device is disabled when a result indicated by the data is determined to meet a predetermined condition.

DETAILED DESCRIPTION

Embodiment

A video recording device and a video recording device control program according to an embodiment will be described with reference to FIGS. 1 to 5.

Figure 1:
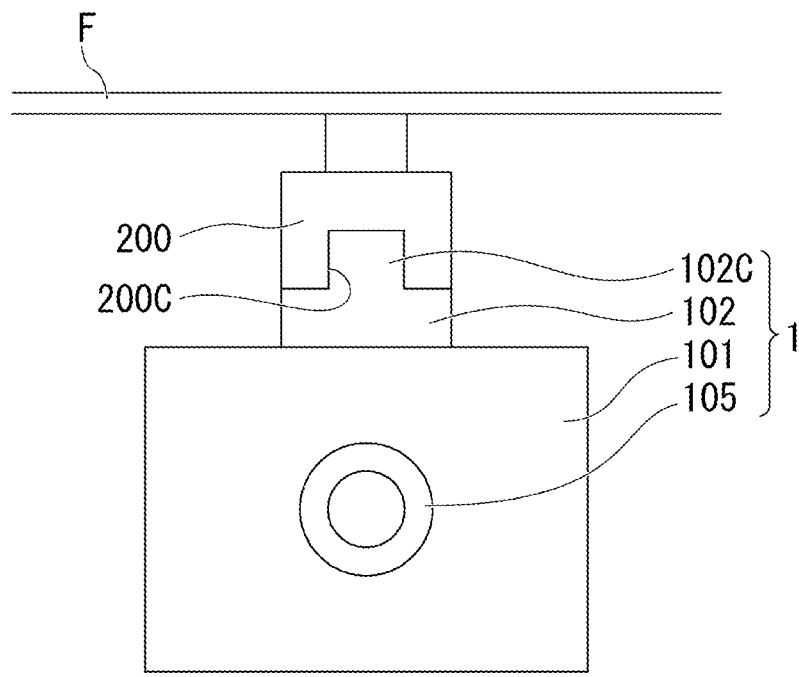
FIG. 1 is a diagram which shows an example of an appearance of a video recording device according to an embodiment.
Figure 2:
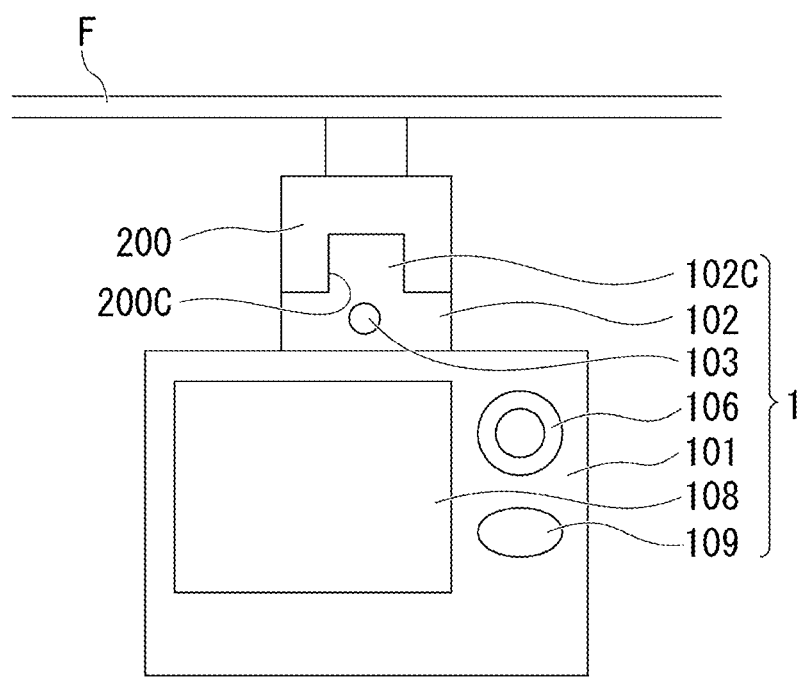
FIG. 2 is a diagram which shows an example of the appearance of the video recording device according to the embodiment.
Figure 3:
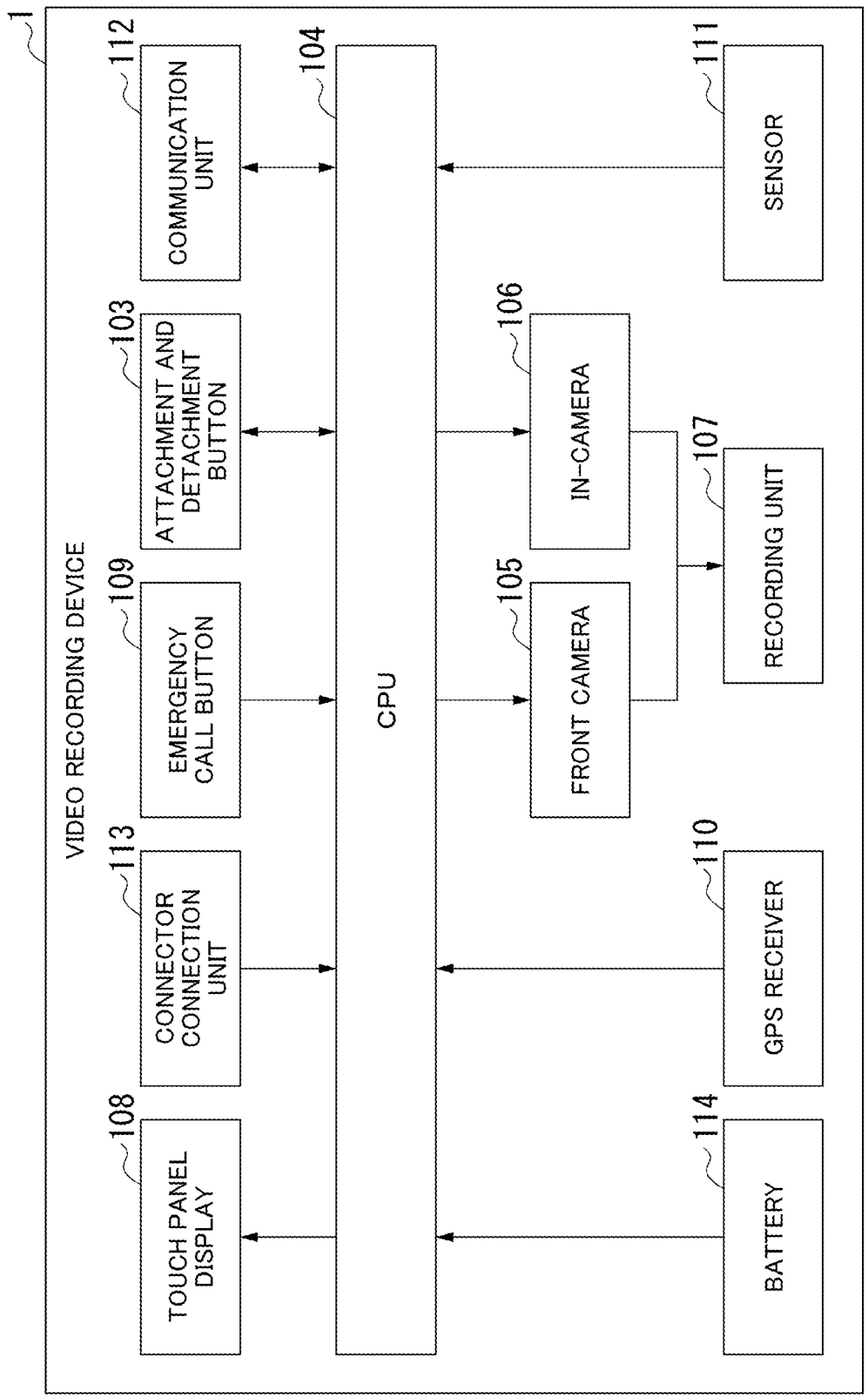
FIG. 3 is a diagram which shows an example of a hardware configuration of the video recording device according to the embodiment.

First, a hardware configuration of the video recording device according to the embodiment will be described with reference to FIGS. 1 to 3. FIGS. 1 and 2 are diagrams which show examples of an appearance of the video recording device according to the embodiment. FIG. 3 is a diagram which shows an example of the hardware configuration of the video recording device according to the embodiment.

The video recording device 1 shown in FIGS. 1, 2, and 3 is a device that records a situation inside or outside a vehicle when a traffic accident occurs as a video for a purpose of properly resolving the traffic accident. The video recording device 1 is a device called a drive recorder in Japan and a dashcam in Europe and the United States. Note that the video recording device 1 is not limited to a drive recorder (dashcam), and may be, for example, a general-purpose terminal device equipped with a camera, such as a smartphone or tablet.

As shown in FIGS. 1, 2, and 3, the video recording device 1 includes a housing 101, a fitting member 102, an attachment and detachment button 103, a central processing unit (CPU) 104, a front camera 105, an in-camera 106, a recording unit 107, a touch panel display 108, an emergency call button 109, a global positioning system (GPS) receiver 110, a sensor 111, a communication unit 112, a connector connection unit 113, and a battery 114. In addition, FIG. 1 is a diagram which shows a side of the video recording device 1 to which the front camera 105 is attached. On the other hand, FIG. 2 shows a side of the video recording device 1 to which the in-camera 106 is attached.

The housing 101 has the fitting member 102, the attachment and detachment button 103, the front camera 105, the in-camera 106, the touch panel display 108, the emergency call button 109, and the connector connection unit 113 attached to a surface thereof. The housing 101 houses the CPU 104, the recording unit 107, the GPS receiver 110, the sensor 111, the communication unit 112, and the battery 114.

The fitting member 102 is attached to, for example, an upper surface of the housing 101 to form a convex portion 102C, as shown in FIGS. 1 and 2. The convex portion 102C fits in a concave portion 200C formed on, for example, a support member 200 attached to a windshield F of the vehicle.

In addition, the fitting member 102 has a rod-shaped fixing member in which it protrudes from the convex portion 102C and enters a hole formed in the concave portion 200C to maintain a state in which the convex portion 102C and the concave portion 200C are fitted. Alternatively, the support member 200 has a rod-shaped fixing member in which it protrudes from the concave portion 200C and enters a hole formed in the convex portion 102C to maintain the state in which the convex portion 102C and the concave portion 200C are fitted.

Note that the convex portion 102C and the concave portion 200C may each have a metal terminal attached thereto. At least one of these two terminals transmits a signal to the CPU 104, which indicates that the convex portion 102C and the concave portion 200C are fitted while the convex portion 102C and the concave portion 200C are fitted. As a result, the two terminals cause the CPU 104 to recognize that the convex portion 102C and the concave portion 200C are fitted. On the other hand, at least one of these two terminals transmits a signal to the CPU 104, which indicates that the convex portion 102C and the concave portion 200C are separated while the convex portion 102C and the concave portion 200C are separated. As a result, the two terminals cause the CPU 104 to recognize that the convex portion 102C and the concave portion 200C are separated.

The video recording device 1 records a situation inside or outside the vehicle as a video while being attached to the vehicle by the convex portion 102C and the concave portion 200C being fitted. On the other hand, the video recording device 1 records the situation inside or outside the vehicle as a video while being taken out from the vehicle by the convex portion 102C and the concave portion 200C being separated.

The attachment and detachment button 103 is a button that is mechanically interlocked with the fixing member described above, and is a button to be pressed for a purpose of switching between a state in which the fixing member has entered the hole and a state in which the fixing member has not entered the hole.

Figure 4:
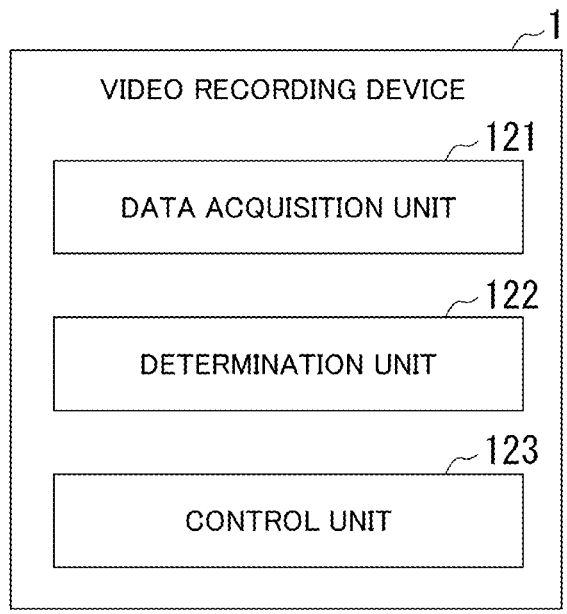
FIG. 4 is a diagram which shows an example of a software configuration of the video recording device according to the embodiment.

The CPU 104 realizes the functions shown in FIG. 4 by reading and executing a video recording device control program. In addition, the CPU 104 may read and execute a program other than the video recording device control program to realize functions necessary for realizing each function of the video recording device 1.

The front camera 105 is a camera that captures at least one of a moving image and a still image of the situation inside or outside the vehicle. When the video recording device 1 is attached to the vehicle, the front camera 105 captures at least one of a moving image and a still image in front of the vehicle mainly through the windshield of the vehicle. On the other hand, when the video recording device 1 is taken out from the vehicle, the front camera 105 captures at least one of a moving image and a still image of the situation inside or outside the vehicle not limited to a situation in front of the vehicle.

The in-camera 106 is a camera that captures at least one of the moving image and still image of the situation inside or outside the vehicle. When the video recording device 1 is attached to the vehicle, the in-camera 106 mainly captures at least one of a moving image and a still image inside a compartment of the vehicle. In addition, when the video recording device 1 is attached to the vehicle, the in-camera 106 may capture at least one of a moving image and a still image of at least one of a side and a rear of the vehicle through a window of the vehicle. On the other hand, when the video recording device 1 is taken out from the vehicle, the in-camera 106 captures at least one of the moving images and still images of the situation inside or outside the vehicle not limited to the situation inside the compartment of the vehicle and the situation of the side and the rear of the vehicle.

The recording unit 107 has at least one storage medium. The recording unit 107 includes, for example, a main storage device and an auxiliary storage device.

The main storage device is, for example, a random access memory (RAM), and stores in advance a video recording device control program and other video recording device control programs that are read and executed by the CPU 104.

The auxiliary storage device is, for example, a hard disk drive (HDD), a solid-state drive (SSD), a flash memory, or a read only memory (ROM). The auxiliary storage device stores, for example, the moving image and still image captured by the front camera 105 and the moving image and still image captured by the in-camera 106.

The touch panel display 108 is a kind of interface used to operate the video recording device 1. For example, the touch panel display 108 displays a graphical user interface (GUI) used to operate the video recording device 1. In addition, the touch panel display 108 may display the moving image and still image captured by the front camera 105 and the moving image and still image captured by the in-camera 106 when necessary.

The emergency call button 109 is a kind of interface used to operate the video recording device 1. The emergency call button 109 is a button to be pressed to report to a customer support window such as a road service provider, an insurance company, and a security company, the police, an ambulance, a fire department, and the like when an event such as a traffic accident, an injury, or illness has occurred.

The GPS receiver 110 receives signals necessary for calculating a position of the video recording device 1 from satellites.

The sensor 111 includes, for example, at least one of an illuminance sensor, an acceleration sensor, a geomagnetism sensor, and an atmospheric pressure sensor. The illuminance sensor detects an illuminance around the video recording device 1. The acceleration sensor detects an acceleration of the video recording device 1. The geomagnetic sensor detects a magnitude and a direction of a magnetic field around the video recording device 1. The atmospheric pressure sensor detects an atmospheric pressure around the video recording device 1.

The communication unit 112 executes communication with other devices through a network. In addition, the network is, for example, the Internet, a wide area network (WAN), or an intranet (a local area network). For example, the video recording device 1 may communicate with the vehicle using the communication unit 112 and may also acquire, for example, data indicating a vehicle speed measured by a vehicle speed sensor installed in the vehicle, data indicating a set gear stage of the vehicle, and the like.

The connector connection unit 113 is an input/output port to which a cable connecting the video recording device 1 to another device is connected. For example, the video recording device 1 may acquire the data indicating the vehicle speed measured by the vehicle speed sensor installed in the vehicle, the data indicating the set gear stage of the vehicle, and the like through the connector connection unit 113.

The battery 114 supplies power to each of elements that constitute the video recording device 1.

FIG. 4 is a diagram which shows an example of a software configuration of the video recording device according to the embodiment. The video recording device 1 reads and executes a video recording device control program by, for example, using the CPU 104, and implements a data acquisition unit 121, a determination unit 122, and a control unit 123 shown in FIG. 4.

The data acquisition unit 121 acquires data indicating a result of detecting a phenomenon associated with an action of taking the video recording device 1 out from the vehicle. The data is, for example, data indicating the moving image or the still image captured by the front camera 105 or the in-camera 106. Alternatively, the data is data indicating the illuminance detected by the illuminance sensor. Alternatively, the data is data indicating the acceleration detected by the acceleration sensor.

In addition, the data acquisition unit 121 may acquire data indicating a result of detecting a phenomenon occurring before the action of taking the video recording device 1 out from the vehicle is started. Examples of such data include, for example, data indicating a moving image or a still image captured before a user touches the video recording device 1 to take out the video recording device 1, data indicating the illuminance detected by the illuminance sensor before the action is performed, and data indicating the acceleration detected by the acceleration sensor before the action is performed.

In addition, the data acquisition unit 121 may acquire data indicating a result of detecting a phenomenon occurring after the action of taking the video recording device 1 out from the vehicle is started. Examples of such data include, for example, data indicating a moving image or a still image captured after the user has touched the video recording device 1 to take out the video recording device 1, data indicating the illuminance detected by the illuminance sensor after the action is performed, and data indicating the acceleration detected by the acceleration sensor after the action is performed.

In addition, the data acquisition unit 121 may acquire one type of the data described above as a first data, and acquire data different from the data as a second data. The first data and the second data may be treated differently by the determination unit 122 when necessary. In this case, both of the first data and the second data may indicate a result of detecting a first phenomenon associated with the action of taking the video recording device 1 out from the vehicle. Alternatively, in this case, the first data indicates the result of detecting the first phenomenon associated with the action of taking the video recording device 1 out from the vehicle, and the second data indicates the result of detecting a second phenomenon that is associated with the action of taking the video recording device 1 out from the vehicle and is different from the first phenomenon.

The determination unit 122 determines whether a result indicated by the data acquired by the data acquisition unit 121 meets a predetermined condition.

For example, when the data is data indicating the moving image or the still image captured by the front camera 105 or the in-camera 106, the predetermined condition is that the user's action of trying to take out the video recording device 1 is reflected in the moving image or the still image. Alternatively, when the data is data indicating the moving image or the still image captured by the front camera 105 or the in-camera 106, the predetermined condition is, for example, that the user's action of taking out the video recording device 1 is reflected in the moving image or the still image.

For example, when either of these two actions is performed, the user's palm is reflected in at least one of the front camera 105 and the in-camera 106. Therefore, examples of a moving image and a still image that meet the predetermined condition described above include, for example, a moving image and a still image in which the user's palm is reflected. Moreover, determination of whether the user's palm is reflected in the moving image or still image is executed by using, for example, a learned machine learning model.

On the other hand, for example, when the user is trying to operate the touch panel display 108 or when the user has operated the touch panel display 108, the user's finger is reflected in the in-camera 106 in a size equal to or greater than a certain size. Therefore, examples of a moving image and a still image that do not meet the predetermined condition described above include, for example, a moving image and a still image in which the user's finger is reflected in a size equal to or greater than a certain size. In addition, determination of whether the user's finger is reflected in a moving image or a still image in a size equal to or greater than a certain size is executed by using, for example, the learned machine learning model.

In addition, for example, when the data is data indicating the moving image or the still image captured by the front camera 105 or the in-camera 106, the predetermined condition is that a change in the moving image or the still image within a certain period of time is a certain amount or more. A change in the moving image or the still image within a certain period of time referred herein is, for example, a change in a position in a moving image or a still image of a contour of an object reflected in the moving image or the still image. Examples of such an object include the user's face and arms in the compartment of the vehicle, and a seat present in the compartment of the vehicle. Moreover, processing of recognizing an object is executed by using, for example, the learned machine learning model.

In addition, when the data is data indicating the moving image or the still image captured by the front camera 105 or in-camera 106, the predetermined condition is that an entire moving image or still image is darker than a certain level by the front camera 105 or the in-camera 106 being covered with the user's hand.

Alternatively, when the data is data indicating the illuminance detected by the illuminance sensor, the predetermined condition is that the illuminance indicated by the data is less than a predetermined threshold value due to the front camera 105 or the in-camera 106 being covered with the user's hand.

Alternatively, when the data is data indicating the acceleration detected by the acceleration sensor, the predetermined condition is that an absolute value of the acceleration indicated by the data exceeds a predetermined threshold value due to a movement of the video recording device 1 by the user. Alternatively, when the data is data indicating the acceleration detected by the acceleration sensor, the predetermined condition is that the acceleration in a predetermined direction indicated by the data exceeds a predetermined threshold value due to the movement of the video recording device 1 by the user.

Moreover, when the data acquisition unit 121 acquires the first data and the second data described above, the determination unit 122 may also determine whether a result indicated by the first data and a result indicated by the second data meet a predetermined condition.

For example, the determination unit 122 may determine whether the result indicated by the first data meets a first condition that is a part of the predetermined condition, and determine whether the result indicated by the second data meets a second condition that is a part of the predetermined condition. At this time, the determination unit 122 may determine that the predetermined condition is met when both the first condition and the second condition are met. Alternatively, at this time, when it is determined that the result indicated by the second data meets the second condition even if it is determined that the result indicated by the first data does not meet the first condition, the determination unit 122 may determine that the predetermined condition is met.

When the control unit 123 determines that the result indicated by the data acquired by the data acquisition unit 121 meets the predetermined condition, the control unit 123 controls the video recording device 1 such that an operation for the interface used to operate the video recording device 1 is disabled.

In addition, the control unit 123 controls the video recording device 1 such that the operation for the interface is disabled when it is determined that the result indicated by the first data and the result indicated by the second data meet the predetermined condition.

Moreover, the control unit 123 controls the video recording device 1 such that the operation for the interface is disabled when it is determined that the result indicated by the first data meets the first condition and that the result indicated by the second data meets the second condition.

In addition, when it is determined that the result indicated by the second data meets the second condition even if it is determined that the result indicated by the first data does not meet the first condition, the control unit 123 controls the video recording device 1 such that the operation for the interface is disabled.

Note that the control unit 123 may further control the video recording device 1 such that communication with other devices is not executed when it is determined that the result indicated by the data meets the predetermined condition.

Furthermore, the control unit 123 further controls the video recording device 1 such that at least one of the captured moving image and still image is not deleted when it is determined that the result indicated by the data meets the predetermined condition.

Figure 5:
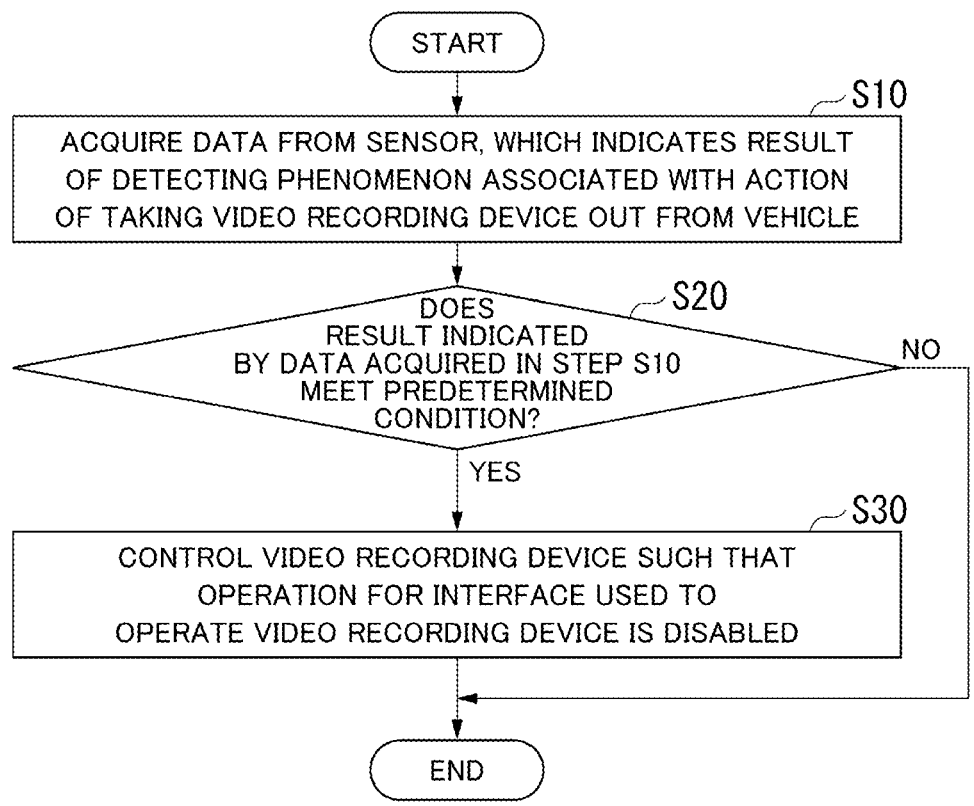
FIG. 5 is a flowchart which shows an example of processing executed by the video recording device according to the embodiment.

Next, an example of processing executed by the video recording device 1 according to the embodiment will be described with reference to FIG. 5. FIG. 5 is a flowchart which shows an example of processing executed by the video recording device according to the embodiment. For example, the video recording device 1 executes the processing shown in FIG. 5 each time when at least one piece of the data described above is acquired. Alternatively, the video recording device 1 executes the processing shown in FIG. 5 each time when a set of the first data and the second data described above is acquired.

In step S10, the data acquisition unit 121 acquires data from the sensor 111, which indicates a result of detecting a phenomenon associated with the action of taking the video recording device 1 out from the vehicle.

In step S20, the determination unit 122 determines whether the result indicated by the data acquired in step S10 meets the predetermined condition. When the determination unit 122 determines that the result indicated by the data obtained in step S10 meets the predetermined condition (YES in step S20), the processing proceeds to step S30. On the other hand, when the determination unit 122 determines that the result indicated by the data acquired in step S10 does not meet the predetermined condition (NO in step S20), the processing is caused to end.

In step S30, the control unit 123 controls the video recording device 1 such that the operation for the interface used to operate the video recording device 1 is disabled.

The video recording device and the video recording device control program according to the embodiment have been described above.

The video recording device 1 includes a data acquisition unit 121, a determination unit 122, and a control unit 123. The data acquisition unit 121 acquires data indicating a result of detecting a phenomenon associated with an action of taking the video recording device 1 out from the vehicle. The determination unit 122 determines whether the result indicated by the data meets a predetermined condition. The control unit 123 controls the video recording device 1 such that an operation for an interface used to operate the video recording device 1 is disabled when it is determined that the result indicated by the data meets the predetermined condition.

As a result, the video recording device 1 can detect that the video recording device 1 is taken out from the vehicle, and reduce an occurrence of a situation in which unnecessary processing is executed due to an erroneous operation of the interface when the video recording device 1 is taken out from the vehicle.

In addition, the video recording device 1 acquires a first data and a second data indicating the result of detecting the phenomenon associated with the action of taking the video recording device 1 out from the vehicle. Then, when the video recording device 1 has determined that the result indicated by the first data and the result indicated by the second data meet the predetermined condition, the video recording device 1 is controlled such that the operation for the interface is disabled. That is, the video recording device 1 uses a plurality of pieces of data to determine whether the video recording device 1 is taken out from the vehicle from a plurality of viewpoints.

As a result, the video recording device 1 can more accurately detect the action of taking the video recording device 1 out from the vehicle, and the video recording device 1 can be controlled such that the operation for the interface is disabled when truly necessary.

In addition, the video recording device 1 is controlled such that the operation for the interface is disabled when the video recording device 1 has determined that the result indicated by the first data meets the first condition and that the result indicated by the second data meets the second condition.

As a result, the video recording device 1 can more accurately detect the action of taking the video recording device 1 out from the vehicle, and the video recording device 1 can be controlled such that the operation for the interface is disabled when truly necessary.

In addition, the video recording device 1 is controlled such that the operation for the interface is disabled when the video recording device 1 has determined that the result indicated by the second data meets the second condition even if it is determined that the result indicated by the first data does not meet the first condition.

As a result, even if the video recording device 1 cannot accurately detect the action of taking the video recording device 1 out from the vehicle according to the first condition, the video recording device 1 can detect the action according to the second condition and the video recording device 1 can be controlled such that the operation for the interface is disabled.

In addition, the video recording device 1 acquires data indicating a result of detecting a phenomenon that occurs before an action of taking the video recording device 1 out from the vehicle is started. As a result, the video recording device 1 can detect, before the action of taking the video recording device 1 out from the vehicle is started, the action, and the video recording device 1 can be controlled such that the operation for the interface is disabled before the video recording device is erroneously operated by the action.

Moreover, the video recording device 1 acquires data indicating a result of detecting a phenomenon that occurs after the action of taking the video recording device 1 out from the vehicle is started.

As a result, the video recording device 1 can detect that the action of taking the video recording device 1 out from the vehicle is surely performed, and the video recording device 1 can be controlled such that the operation for the interface is disabled before the video recording device 1 is erroneously operated by the action.

In addition, when the video recording device 1 has determined that the result indicated by the data meets the predetermined condition, the video recording device 1 is further controlled such that communication with other devices is not executed.

As a result, the video recording device 1 can reduce an occurrence of a situation in which communication is erroneously executed due to the action of taking the video recording device 1 out from the vehicle.

In addition, the video recording device 1 further controls the video recording device 1 so that at least one of a captured moving image and a still image is not deleted when it is determined that the result indicated by the data meets a predetermined condition.

As a result, the video recording device 1 can reduce the occurrence of a situation in which at least one of a moving image and a still image is erroneously deleted due to the action of taking the video recording device 1 out from the vehicle.

In the embodiment, the touch panel display 108 and the emergency call button 109 are described as examples of interfaces provided in the video recording device 1, but the present invention is not limited to these. The interface includes at least some of a button, a switch, and the like used for an operation of the video recording device 1.

Further, in the embodiment described above, a case in which functions of the video recording device 1 shown in FIG. 4 are realized by the CPU 104 that reads and executes the video recording device control program has been described as an example, but the present invention is not limited to this.

At least some of the functions provided by the video recording device 1 shown in FIG. 4 may also be realized by hardware including a circuit unit (circuitry) such as large scale integration (LSI), an application specific integrated circuit (ASIC), an field-programmable gate array (FPGA), a graphics processing unit (GPU). Alternatively, at least some of the functions provided by the video recording device 1 shown in FIG. 4 may also be realized by software and hardware in cooperation.

As described above, the embodiment of the present invention has been described in detail with reference to the drawings, but the specific configuration is not limited to this embodiment, and various combinations, modifications, and at least one of substitutions and design changes may be added.

Also, an effect of the embodiment of the present invention described above is an effect shown as an example. Therefore, the embodiment of the present invention can have other effects that can be recognized by those skilled in the art from the description of the embodiment above, in addition to the effect described above.

INDUSTRIAL APPLICABILITY

The video recording device and the video recording device control program of the present embodiment can be used in devices called drive recorders in Japan and called dashcams in Europe and the United States.

What is claimed is:

1. A video recording device comprising:
a processor coupled to a memory storing instructions for the processor to function as:
a data acquisition unit configured to acquire data indicating a result of detecting a phenomenon associated with an action of taking the video recording device out from a vehicle;
a determination unit configured to determine whether the result indicated by the data meets a predetermined condition; and
a control unit configured to control the video recording device such that an operation for an interface used to operate the video recording device is disabled when the result indicated by the data is determined to meet the predetermined condition,
wherein the data acquisition unit acquires the data indicating a result of detecting the phenomenon occurring before an action of taking the video recording device out from the vehicle is started.

2. The video recording device according to claim 1,
wherein the data acquisition unit acquires a first data indicating a result of detecting a phenomenon associated with an action of taking the video recording device out from the vehicle, and acquires a second data which indicates a result of detecting the phenomenon associated with the action of taking the video recording device out from the vehicle and is different from the first data,
the determination unit determines whether a result indicated by the first data and a result indicated by the second data meet the predetermined condition, and
the control unit controls the video recording device such that an operation for the interface is disabled when the result indicated by the first data and the result indicated by the second data are determined to meet the predetermined condition.

3. The video recording device according to claim 2,
wherein the data acquisition unit acquires the first data indicating a result of detecting a first phenomenon associated with an action of taking the video recording device out from the vehicle, and acquires the second data indicating a result of detecting the first phenomenon.

4. The video recording device according to claim 2,
wherein the data acquisition unit acquires the first data indicating a result of detecting a first phenomenon associated with an action of taking the video recording device out from the vehicle, and acquires the second data indicating a result of detecting a second phenomenon that is associated with an action of taking the video recording device out from the vehicle and is different from the first phenomenon.

5. The video recording device according to claim 2,
wherein the determination unit determines whether a result indicated by the first data meets a first condition that is a part of the predetermined condition, and determines whether a result indicated by the second data meets a second condition that is a part of the predetermined condition, and
the control unit controls the video recording device such that an operation for the interface is disabled when the result indicated by the first data is determined to meet the first condition and the result indicated by the second data is determined to meet the second condition.

6. The video recording device according to claim 2,
wherein the determination unit determines whether a result indicated by the first data meets a first condition that is a part of the predetermined condition, and determines whether a result indicated by the second data meets a second condition that is a part of the predetermined condition, and the control unit controls the video recording device such that an operation for the interface is disabled when it is determined that the result indicated by the second data meets the second condition even if it is determined that the result indicated by the first data does not meet the first condition.

7. The video recording device according to claim 1,
wherein the control unit further controls the video recording device such that communication with other devices is not executed when a result indicated by the data is determined to meet a predetermined condition.

8. The video recording device according to claim 1,
wherein the control unit further controls the video recording device such that at least one of a captured moving image and a captured still image is not deleted when a result indicated by the data is determined to meet a predetermined condition.

9. A non-transitory computer readable medium storing a program causing a computer to execute:
a data acquisition function of acquiring data indicating a result of detecting a phenomenon associated with an action of taking a video recording device out from a vehicle, a determination function of determining whether a result indicated by the data meets a predetermined condition, and a control function of controlling the video recording device such that an operation for an interface used to operate the video recording device is disabled when a result indicated by the data is determined to meet a predetermined condition, wherein the data acquisition function acquires the data indicating a result of detecting the phenomenon occurring before an action of taking the video recording device out from the vehicle is started.

\* \* \* \* \*